United States Patent
Gould et al.

(10) Patent No.: US 11,897,409 B2
(45) Date of Patent: Feb. 13, 2024

(54) APPARATUS AND METHOD FOR FLOOR-MOUNTED PASSENGER LOWER LEG PROTECTION

(71) Applicant: ZF Passive Safety Systems US Inc., Washington, MI (US)

(72) Inventors: Douglas Gould, Lake Orion, MI (US); Gabriela Diaz, Sterling Heights, MI (US); Kurt F. Fischer, Rochester, MI (US); Hylus Ranjit Raj Jayakar, Washington Township, MI (US); Kiran Mohan Veepuri, Rochester Hills, MI (US); David Varcoe, Bruce Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/608,489

(22) PCT Filed: Mar. 18, 2020

(86) PCT No.: PCT/US2020/023268
§ 371 (c)(1),
(2) Date: Nov. 3, 2021

(87) PCT Pub. No.: WO2020/231511
PCT Pub. Date: Nov. 19, 2020

(65) Prior Publication Data
US 2022/0212622 A1 Jul. 7, 2022

Related U.S. Application Data

(60) Provisional application No. 62/847,369, filed on May 14, 2019.

(51) Int. Cl.
*B60R 21/231* (2011.01)
*B60R 21/216* (2011.01)
(Continued)

(52) U.S. Cl.
CPC ........ *B60R 21/216* (2013.01); *B60R 21/0136* (2013.01); *B60R 21/231* (2013.01);
(Continued)

(58) Field of Classification Search
CPC .......... B60R 21/20; B60R 2021/23176; B60R 2021/0046
See application file for complete search history.

(56) References Cited

U.S. PATENT DOCUMENTS

| 5,931,493 A | 8/1999 | Sutherland |
| 6,217,059 B1 | 4/2001 | Brown et al. |

(Continued)

FOREIGN PATENT DOCUMENTS

| DE | 102014000863 A1 * | 8/2014 | ............. B60R 21/20 |
| DE | 102015116170 A1 * | 4/2016 | ........... B60R 21/206 |

(Continued)

OTHER PUBLICATIONS

PCT Search Report for corresponding PCT Application Serial No. PCT/US2020/023268, dated Jun. 12, 2020, pp. 1.

*Primary Examiner* — Nicole T Verley
(74) *Attorney, Agent, or Firm* — TAROLLI, SUNDHEIM, COVELL & TUMMINO L.L.P.

(57) ABSTRACT

An apparatus for helping to protect occupants of a vehicle in the event of a collision includes a deployable restraint having a stored, predeployment condition in a vehicle floor. The restraint is deployable from the floor to restrain the feet and/or lower legs of an occupant from swinging forward and upward in response to a vehicle collision. In one configuration, the deployable restraint can include a module comprising an airbag and an inflator for inflating and deploying the airbag. The module can include a door that opens in response to deployment of the airbag and that serves as a reaction surface for the airbag. In another configuration, the (Continued)

deployable restraint can include a restraining panel configured to move to a deployed position extending above the vehicle floor adjacent the occupants lower leg and feet.

20 Claims, 5 Drawing Sheets

(51) Int. Cl.
  *B60R 21/0136* (2006.01)
  *B60R 21/264* (2006.01)
  *B60R 21/00* (2006.01)
  *B60R 21/01* (2006.01)

(52) U.S. Cl.
  CPC .... *B60R 21/264* (2013.01); *B60R 2021/0046* (2013.01); *B60R 2021/0053* (2013.01); *B60R 2021/01013* (2013.01); *B60R 2021/23161* (2013.01); *B60R 2021/23176* (2013.01)

(56) References Cited

U.S. PATENT DOCUMENTS

| | | | |
|---|---|---|---|
| 9,446,731 | B1 | 9/2016 | West et al. |
| 10,525,922 | B1* | 1/2020 | Lin ................... B60R 21/2338 |
| 11,400,883 | B2* | 8/2022 | Yamada ................ B60R 21/207 |
| 2005/0062264 | A1 | 3/2005 | Arwood et al. |
| 2007/0200320 | A1 | 8/2007 | Keshavaraj |
| 2015/0061268 | A1* | 3/2015 | Nagasawa ............. B60R 21/231 |
| | | | 280/730.1 |
| 2016/0297392 | A1 | 10/2016 | Schneider et al. |
| 2020/0130632 | A1* | 4/2020 | Sekizuka ............. B60R 21/231 |
| 2020/0223343 | A1* | 7/2020 | Ohno ...................... B60R 21/02 |
| 2020/0376989 | A1* | 12/2020 | Simecek ............. B64D 11/062 |
| 2021/0046890 | A1* | 2/2021 | Jayakar ................... B60R 21/20 |
| 2021/0214092 | A1* | 7/2021 | Pang ...................... B64D 25/00 |
| 2022/0001822 | A1* | 1/2022 | Campbell ........... B60R 21/0152 |
| 2022/0009443 | A1* | 1/2022 | Fischer ................ B60R 21/013 |

FOREIGN PATENT DOCUMENTS

| | | | |
|---|---|---|---|
| DE | 102019132986 A1 * | 6/2021 | |
| JP | 4180415 B2 * | 11/2008 | |
| JP | 2020189575 A * | 11/2020 | |
| WO | WO-2015061336 A2 * | 4/2015 | ......... B60N 2/42727 |
| WO | WO-2016085630 A1 * | 6/2016 | ............ B60R 21/21 |
| WO | WO-2019168883 A1 * | 9/2019 | ............ B60N 2/143 |

* cited by examiner

APPARATUS AND METHOD FOR FLOOR-MOUNTED PASSENGER LOWER LEG PROTECTION

RELATED APPLICATION

This application claims the benefit of U.S. Provisional Application Ser. No. 62/847,369, filed on May 14, 2019, the disclosure of which is hereby incorporated by reference in its entirety.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure traditionally relied upon for supporting various vehicle safety devices.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

BACKGROUND

An apparatus for helping to protect occupants of a vehicle in the event of a collision includes a deployable restraint having a stored, pre-deployment condition in a vehicle floor. The restraint is deployable from the floor to restrain the feet and/or lower legs of an occupant from swinging forward and upward in response to a vehicle collision.

According to one aspect, the restraint can be a component of a module installed in or on the vehicle floor, and the vehicle is free from structure other than the floor and module components for providing a reaction surface for supporting the restraint.

According to another aspect, alone or in combination with any other aspect, the deployable restraint can include an airbag and an inflator for inflating and deploying the airbag.

According to another aspect, alone or in combination with any other aspect, the module can include a door that opens in response to deployment of the airbag. The door can be configured to serve as a reaction surface for the airbag.

According to another aspect, alone or in combination with any other aspect, the module can include a tether for limiting movement of the door so that the door can serve as a reaction surface for the airbag.

According to another aspect, alone or in combination with any other aspect, the deployable restraint can include a restraining panel configured to move to a deployed position extending above the vehicle floor adjacent the occupant's lower legs and feet. The restraining panel, when deployed, can engage the occupant's feet to prevent the feet and lower legs of the occupant from swinging upward and forward in response to a vehicle collision.

According to another aspect, alone or in combination with any other aspect, the module can include an actuator for actuating the restraining panel to pivot or otherwise move to the deployed position.

According to another aspect, alone or in combination with any other aspect, the actuator can include a pyrotechnic actuator.

According to another aspect, alone or in combination with any other aspect, the pyrotechnic actuator can be configured to limit movement of the restraint panel after deployment so that the restraint panel can act as a reaction surface for receiving the occupant's feet and legs.

According to another aspect, alone or in combination with any other aspect, the vehicle can be an autonomous vehicle.

According to another aspect, alone or in combination with any other aspect, a safety module can include the apparatus according to any of the aforementioned aspects in addition to a housing configured to be mounted in the vehicle floor.

The vehicle safety system can also include a sensor/controller for sensing the occurrence of an event for which deployment of the deployable restraint is desired. The sensor/controller can be configured to actuate the deployable restraint in response to sensing the occurrence of the event for which deployment is desired.

A method for helping to protect occupants of a vehicle in the event of a collision can include deploying from the vehicle floor a restraint to restrain the feet and/or lower legs of an occupant from swinging forward and upward in response to a vehicle collision.

The restraint can be an airbag module including an airbag and an inflator for inflating and deploying the airbag. The module can include a door that opens in response to deployment of the airbag, the door being configured to serve as a reaction surface for the airbag. The module can further include a tether for limiting movement of the door so that the door can serve as a reaction surface for the airbag.

According to another aspect, alone or in combination with any other aspect, the deployable restraint can be a module including a restraining panel configured to move to a deployed position extending above the vehicle floor adjacent the occupant's lower legs and feet. The restraining panel, when deployed, can engage the occupant's feet to prevent the feet and lower legs of the occupant from swinging upward and forward in response to a vehicle collision. The module can include an actuator for actuating the restraining panel to pivot or otherwise move to the deployed position. The actuator can be a pyrotechnic actuator. The pyrotechnic actuator can be configured to limit movement of the restraint panel after deployment so that the restraint panel can act as a reaction surface for receiving the occupant's feet and legs.

DRAWINGS

DESCRIPTION

Figure 1:
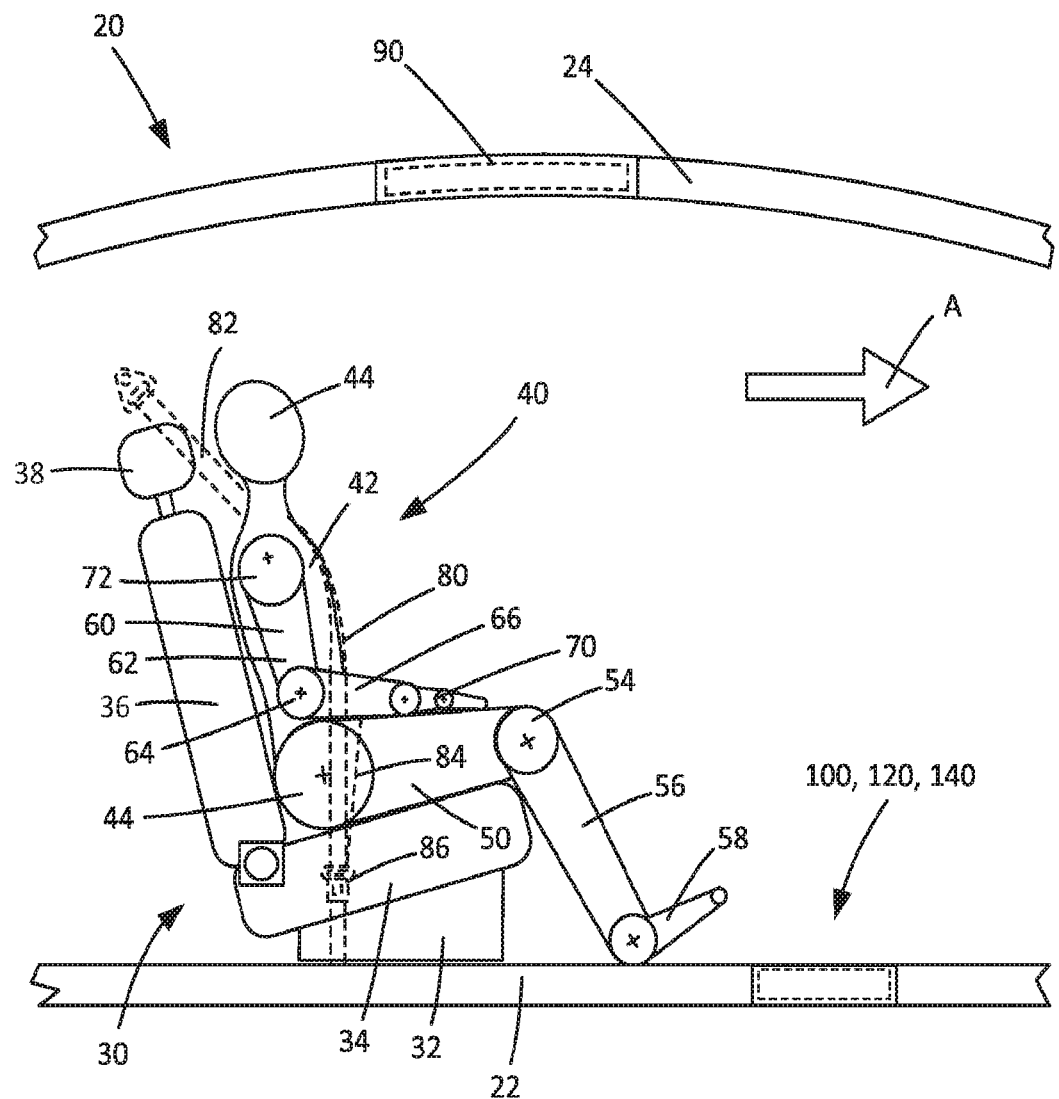
FIG. 1 is a schematic illustration of a vehicle including a vehicle occupant safety system depicting the system in a pre-deployment condition.

One particular scenario where challenges arise due to autonomous vehicle configurations is in the area of leg protection. Referring to FIG. 1, an autonomous vehicle 20 includes a vehicle seat 30 upon which a vehicle occupant 40 is seated. The vehicle seat 30 includes a base 32 connected to the vehicle 20, e.g., to the floor 22. The seat base 32 supports a seat bottom 34. A seatback 36 extends upward from the seat bottom 34 and has a reclined position that can be adjusted. A headrest 38 is positioned at an upper end of the seatback 36.

The occupant 40 is seated on the seat 30, with his/her torso 42 resting on the seatback 36, head 44 positioned at or near the headrest 38, and buttocks 46 and legs 50 (more specifically upper legs 52) resting on the base 32. The occupant's lower legs 56 extend from the knee 54 downward toward the vehicle floor 22, where the occupant's feet 58 rest. In the typical occupant position of FIG. 1, the occupant's arms 60 are at his/her side, with the upper arms 62 adjacent and parallel to the torso 42, bent at the elbows 64 with the lower arms/forearms 66 and hands 70 resting on the upper legs 56.

As shown in FIG. 1, the occupant 40 is restrained by a seatbelt 80, which is a conventional three-point restraint including a shoulder belt portion 82 that extends across the occupant's shoulder 72, and a lap belt portion 84 that extends across the occupant's lap, i.e., where the upper legs 50 meet the torso 42. The seatbelt 80 is secured via a buckle 86, which is anchored to the vehicle 20. To simplify the drawings, the seatbelt 80 is not illustrated in FIGS. 2-5. In FIGS. 2-5, the occupant 40 is wearing a seatbelt, it just isn't shown in the figures. The occupant movements illustrated and described with reference to FIGS. 2-5 are therefore those that would take place with normal use of the seatbelt 80 illustrated in FIG. 1.

Figure 2:
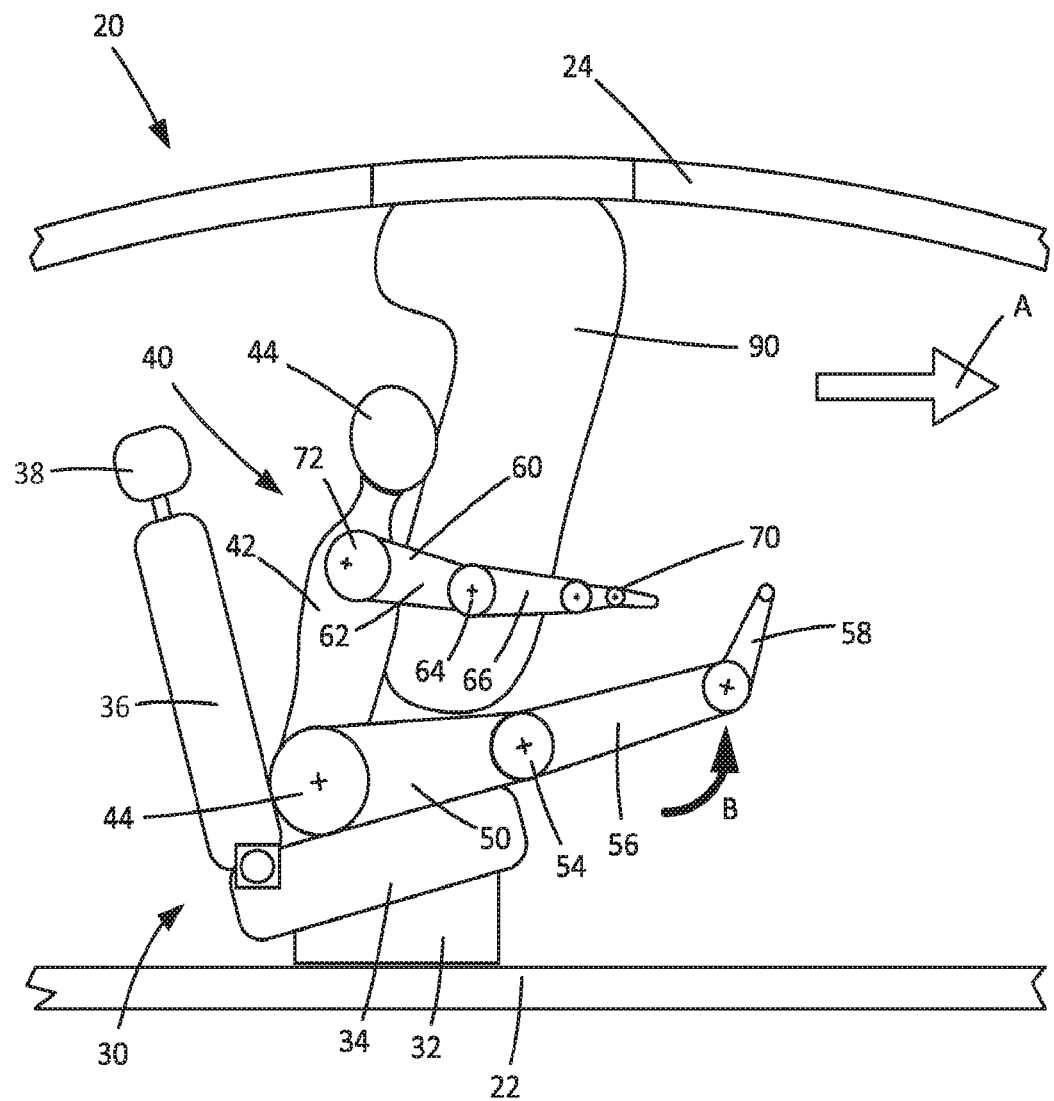
FIG. 2 is a schematic illustration of the vehicle depicting the vehicle occupant safety system in a deployed condition, according to a first configuration of the system.

Referring to FIGS. 1 and 2, a vehicle safety system 10 helps protect the occupant 40 of the autonomous vehicle 20. As shown in FIGS. 1 and 2, the system 10 includes an airbag 90 mounted in a roof 24 of the vehicle 20. Being an autonomous vehicle 20, the passenger compartment or cabin is without operator controls, such as a steering wheel, pedals, instrumentation, center console, etc., and thus represents an autonomous vehicle. Accordingly, the instrument panel is reduced in size and/or removed altogether in order to maximize the space in the cabin. Control interfaces for climate controls, GPS, navigation, entertainment, etc. can, for example, be provided in a center console area of the vehicle 20 located between the passengers of the front and/or rear rows.

Figure 4:
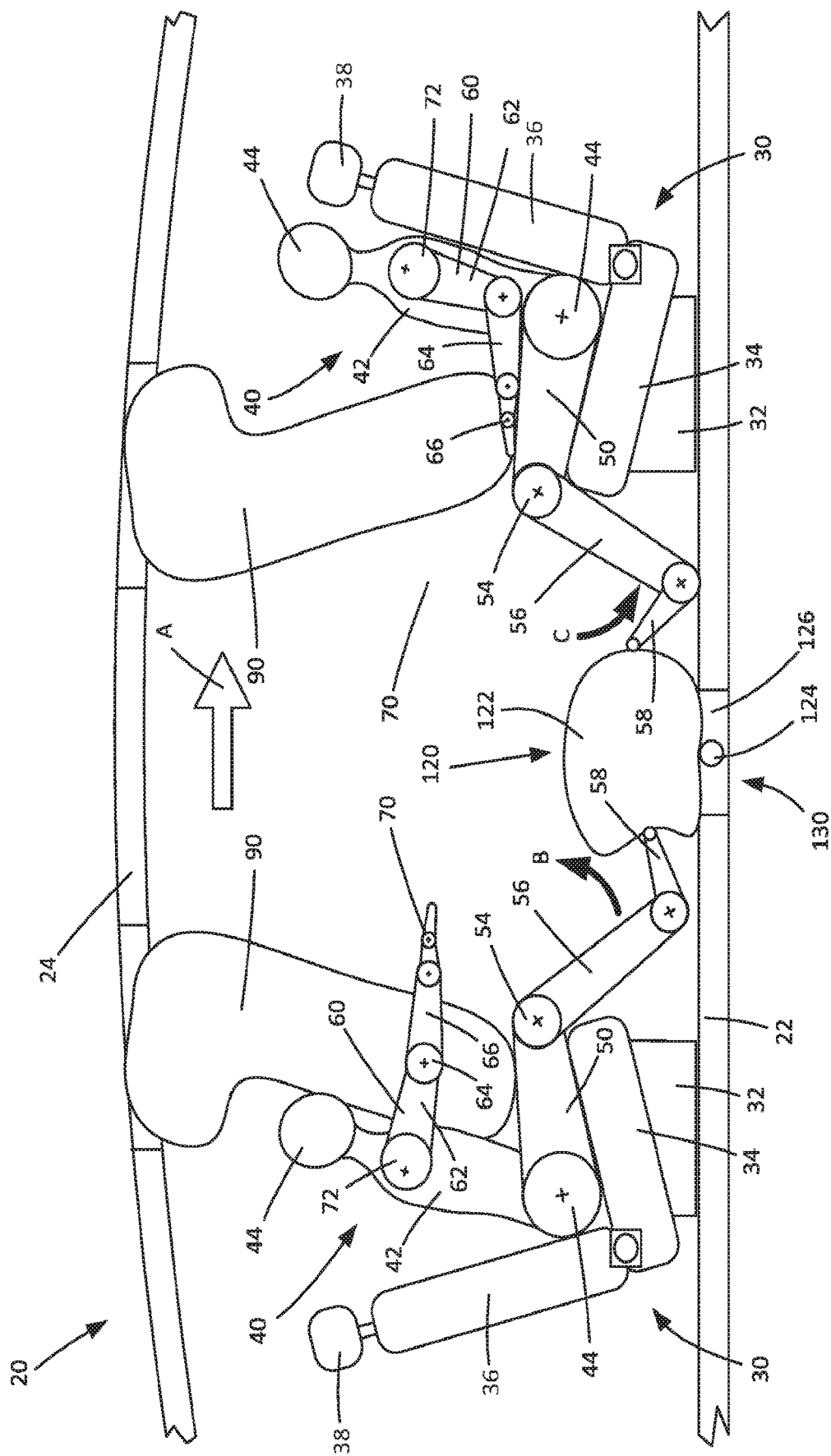
FIG. 4 is a schematic illustration of the vehicle depicting the vehicle occupant safety system in a deployed condition, according to a third configuration of the system.

In this open passenger cabin configuration, vehicle seats 30 can be configured, positioned, and arranged in a variety of manners, not constrained by the need to facilitate a vehicle driver/operator. For example, in FIG. 1, the seat 30 is a forward-facing seat, facing in the direction of forward vehicle travel indicated generally by the arrow labeled A. As shown in FIG. 4, the seats 18 can be arranged facing each other, with the front row FR facing rearward toward the rear row RR.

For the conventional, forward-facing seating arrangement of FIG. 1, in the event of a frontal crash, the occupants 40 is urged forward in the vehicle, as shown in FIG. 2. As shown in FIG. 2, the airbag 90 restrains the occupant 40, particularly the head 44 and torso 42, without restraining the arms 60 and legs 50. As a result, it can be seen that the legs 50 become extended due to inertia, as indicated generally by the arrow labeled B. This can stress the legs 50, such as hyperextension of the knees 54. Non-autonomous vehicles had structure for blocking this motion, such as the instrument panel/footwell (front passengers) and seatbacks of forward seating (rear passengers). Autonomous vehicles may not include these features.

Figure 3:
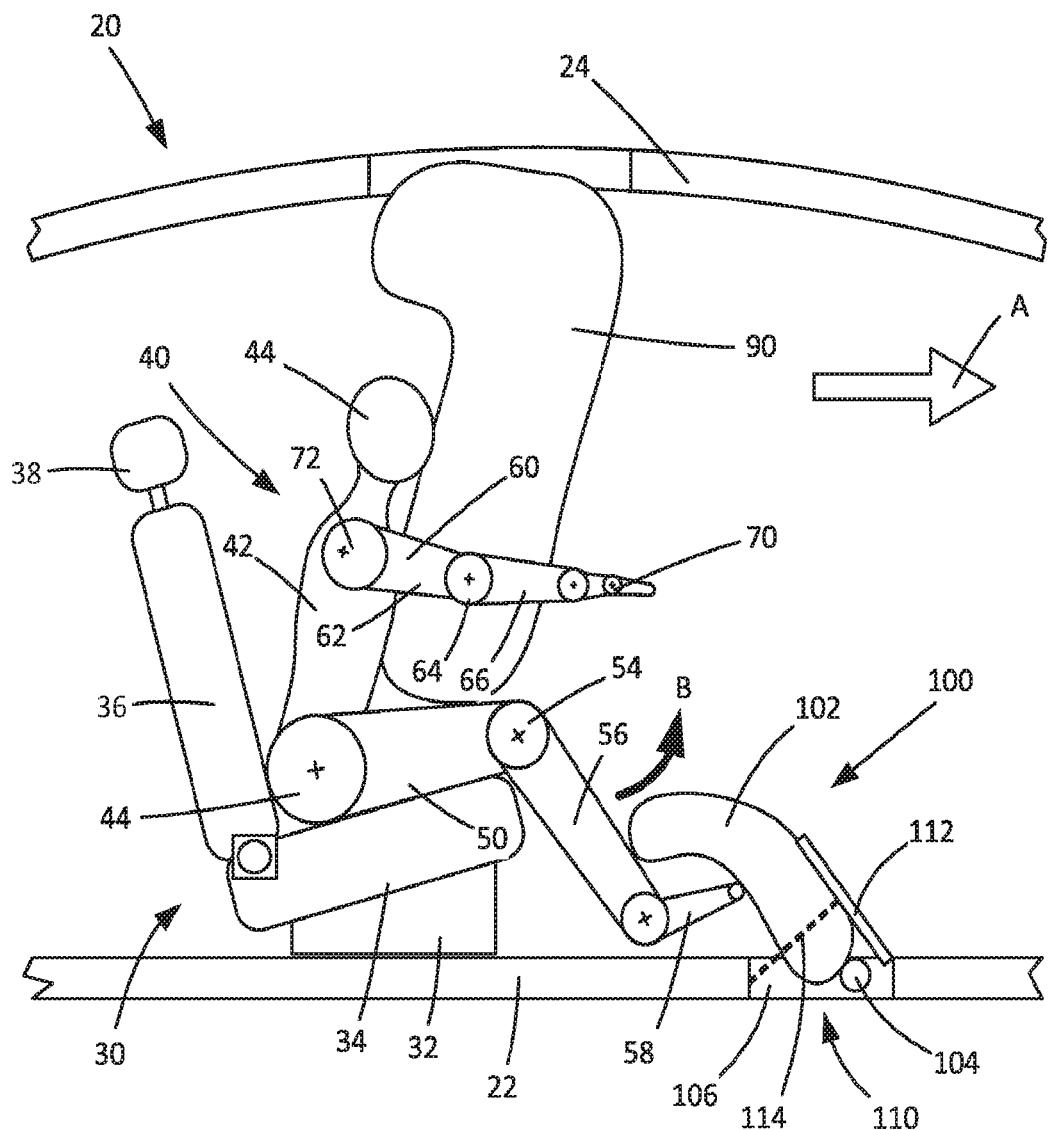
FIG. 3 is a schematic illustration of the vehicle depicting the vehicle occupant safety system in a deployed condition, according to a second configuration of the system.

Referring to FIG. 3, the vehicle safety system 10 includes a lower leg protection device 100. In the example configuration of FIG. 3, the protection device 100 includes an inflatable airbag 102 and an inflator 104 for inflating the airbag, both of which are stored in a housing 106 in the vehicle floor 22. The inflator 104 can, for example, be operatively to the same airbag control unit ("ACU") that causes inflation of the airbag 90 in response to a vehicle collision. The ACU can actuate the inflator 104 to inflate and deploy the airbag 102 in response to the sensed vehicle collision.

The airbag 102, inflator 104, and housing 106 are components of an airbag module 110 that also includes a door 112 that conceals the airbag in a stored condition (see FIG. 1). When the airbag 102 deploys, the door 112 swings open (see arrow C). A retaining member 114, such as a cable or strap, limits the degree to which the door 112 swings open. This can allow the door 112, alone or in combination with the floor 22, to act as a reaction surface for the airbag 102. The airbag 102 can receive the occupant's legs 50 as the lower leg 56 swings (arrow B) in response to the collision. The airbag 102 can therefore cushion the lower leg 56 and foot 58, slowing their acceleration in response to a collision, and providing a desired ride-down effect.

The airbag 102 can have various shapes configured to receive the occupants leg 50. For example, the airbag can be curved so as to extend over and around the occupant's foot 58 and cushion the lower leg 56. Alternatively, the airbag 102 can have a larger, more rounded overall shape (see, FIG. 4). The shape and extent of the airbag 102 can be selected to correspond with the architecture and layout of the vehicle 20.

Referring to FIG. 4, the vehicle has a front row FR and a rear row RR of seating in which the occupants 40 face each other. In the example configuration of FIG. 4, the vehicle safety system 10 includes a lower leg protection device 120. In the example configuration of FIG. 4, the protection device 120 includes an inflatable airbag 122 and an inflator 124 for inflating the airbag, both of which are stored in a housing 126 in the vehicle floor 22. The inflator 124 can, for example, be operatively to the same airbag control unit ("ACU") that causes inflation of the airbag 90 in response to a vehicle collision. The ACU can actuate the inflator 124 to inflate and deploy the airbag 122 in response to the sensed vehicle collision.

The airbag 122, inflator 124, and housing 126 are components of an airbag module 130 that conceals the airbag in a stored condition (see FIG. 1). The airbag 122 deploys from the floor, for example, through a rupturable housing closure member, e.g., a tear seam. The airbag 122 can receive the front and/or rear seat occupant's legs 50 as the lower leg 56 swings (arrow B) in response to the collision. In FIG. 4, it is the front seat occupant 40, whose leg 50 is received by the airbag 122. The airbag 122 cushions the lower leg 56 and foot 58, slowing their acceleration in response to a collision, and providing a desired ride-down effect.

In the vehicle of FIG. 4, the occupant 40 of the rear row seat 30 utilizes the airbag 120. This is because the rear seat occupant's lower legs 56 swing in the direction of arrow B in response to the collision when travelling in the forward direction (see arrow A). The lower legs 56 of the rear row occupant 40 do not extend in response to the collision when vehicle 20 is travelling in the forward direction of arrow A. Instead, the front seat occupant 40 is pushed against the seatback 36, and his/her legs 50 are pushed forward against the seat 30 and the vehicle floor 22. Because of this, the front seat occupant 40 may make little or no use of the airbag 122.

The airbag 122 can have various shapes configured to receive the occupants leg 50. For example, the airbag can be curved or contoured (see, e.g., FIG. 2) so as to extend over and around the occupant's foot 58 and cushion the lower leg 56, from either the front row or rear row seats 30. Alternatively, the airbag 122 can have the illustrated larger, rounded overall shape. The shape and extent of the airbag 122 can be selected to correspond with the architecture and layout of the vehicle 20.

The airbags 102, 122 can be constructed of any suitable material, such as nylon (e.g., woven nylon 6-6 yarns), and may be constructed in any suitable manner. For example, the airbag may include one or more pieces or panels of material. If more than one piece or panel is used, the pieces or panels may be interconnected by known means, such as stitching, ultrasonic welding, heat bonding, or adhesives, to form the airbag. The airbag may be uncoated, coated with a material, such as a gas impermeable urethane, or laminated with a material, such as a gas impermeable film. The airbag thus may have a gas-tight or substantially gas-tight construction. Those skilled in the art will appreciate that alternative materials, such as polyester yarn, and alternatives coatings, such as silicone, may also be used to construct the airbag.

Upon sensing the occurrence of an event for which inflation of the airbag is desired, such as a vehicle collision, the ACU provides signals to the inflators. Upon receiving the signals from the ACU, the inflators are actuated and provide inflation fluid to the inflatable volumes of the airbags 90, 102, 122 in a known manner. The inflating airbags exert a force on their respective housings, which causes the housings to open. This releases the airbags inflate and deploy from their stored conditions in their respective housings to their respective deployed conditions. The airbags, while inflated, help protect the vehicle occupants 40 by absorbing the impact of the occupants. This can be achieved in a variety of manners.

Figure 5:
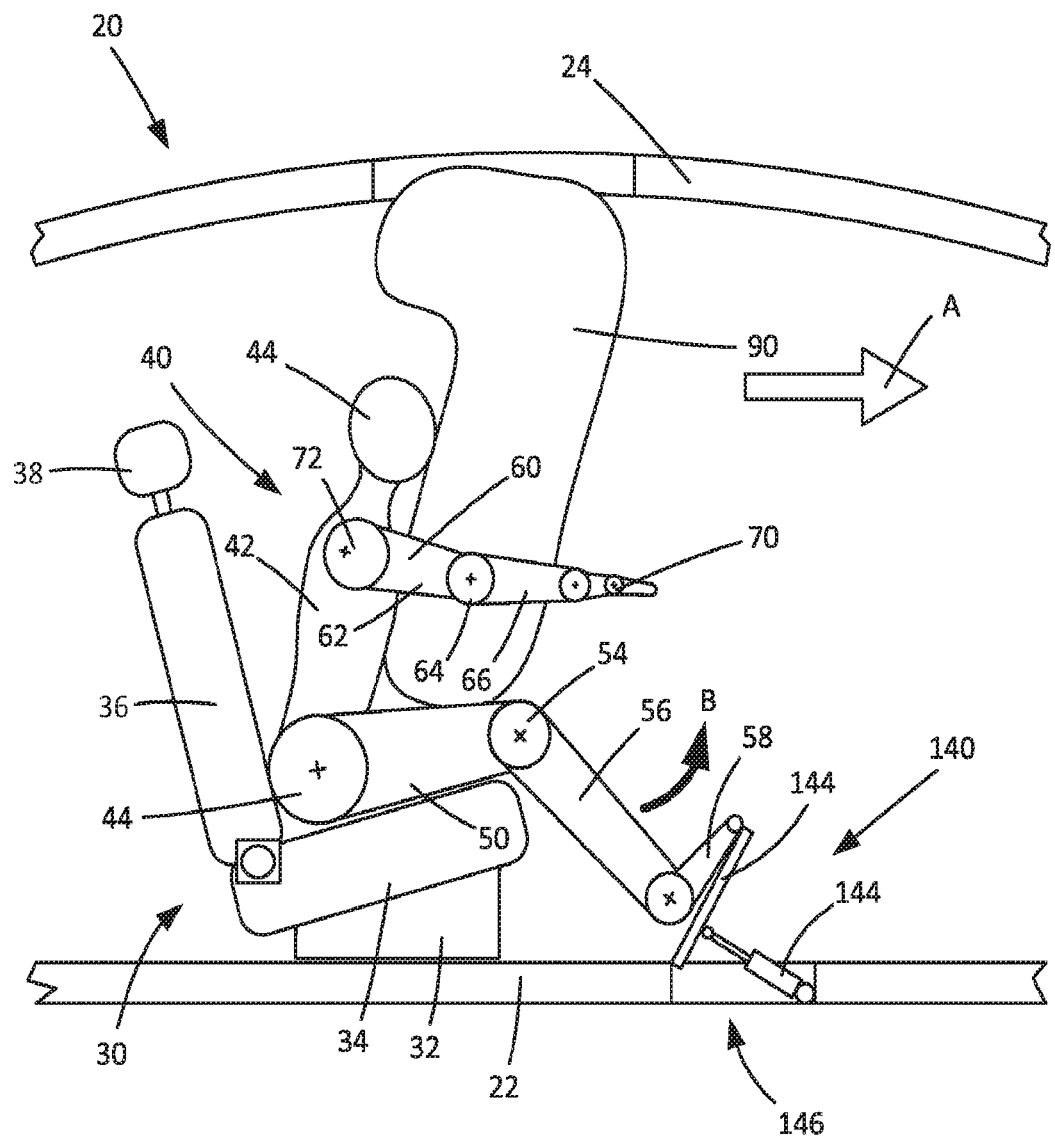
FIG. 5 is a schematic illustration of the vehicle depicting the vehicle occupant safety system in a deployed condition, according to a fourth configuration of the system.

Referring to FIG. 5, for purposes of illustrating an example configuration, the vehicle has a single forward facing seat 30 upon which the occupant 40 is seated. In the example configuration of FIG. 5, the vehicle safety system 10 includes a lower leg protection device 140. In the example configuration of FIG. 4, the protection device 140 includes a foot/lower leg restraint panel 142 and an actuator 144 that is actuatable to move the restraint panel 142 to the illustrated deployed position. The restraint panel 142 and actuator 144 are stored in a housing 126 in the vehicle floor 22 in a pre-deployment condition (see FIG. 1). The restraint panel 142 can be a cover for the inflator and can sit flush with the vehicle floor 22. The actuator 144 can, for example, be operatively to the same airbag control unit ("ACU") that causes inflation of the airbag 90 in response to a vehicle collision. The ACU can actuate the actuator 144 to deploy the restraint panel 142 in response to the sensed vehicle collision.

The restraint panel 142, actuator 144, and housing 146 are components of a module 140. The restraint panel 142 deploys from the floor 22, for example, through a rupturable housing closure member, e.g., a tear seam. The restraint panel 142 can receive the front and/or rear seat occupant's feed 58, which helps prevent rotation and hyperextension of the lower legs 56 due to swinging (arrow B) in response to the collision. The restraint panel 142 restricts lower leg movement toward hyperextension and slows acceleration of the foot 58 and lower leg 56 in response to a collision.

The actuator 144 can be of any configuration capable of deploying the restraint panel 142 in the requisite amount of time. For example, the actuator 144 can be a pyrotechnic actuator including a pyrotechnic material that undergoes a chemical reaction when actuated, e.g., via a squib, which creates pressure for moving an actuator component, such as a piston or plunger, attached to the restraint panel 142. The actuator 144 can be configured to lock at its furthest deployed condition to prevent the restraint panel 142 from moving back toward its pre-deployment condition.

Upon sensing the occurrence of an event for which deployment of the restraint panel is desired, such as a vehicle collision, the ACU provides signals to the airbag inflators and to the actuator 144. Upon receiving the signals from the ACU, the inflators are actuated and provide inflation fluid to the inflatable volumes of the airbags in a known manner. The actuator 144 is actuated to deploy the restraint panel 142, which helps protect the occupant 40 by limiting movement of the lower legs and feet.

From the above description of the invention, those skilled in the art will perceive improvements, changes and modifications to the disclosed system and methods that fall within the spirit and scope of the invention. These improvements, changes, and/or modifications are intended to be covered by the appended claims.

We claim:

1. An apparatus for helping to protect occupants of a vehicle in the event of a collision, comprising a deployable restraint having a stored, pre-deployment condition in a vehicle floor, the restraint being deployable from the floor configured to restrain the feet and/or lower legs of an occupant from swinging forward and upward in response to a vehicle collision.

2. The apparatus recited in claim 1, wherein the restraint is a component of a module installed in or on the vehicle floor, and wherein the vehicle is free from structure other than the floor and module components for providing a reaction surface for supporting the restraint.

3. The apparatus recited in claim 2, wherein the deployable restraint comprises an airbag and an inflator for inflating and deploying the airbag.

4. The apparatus recited in claim 3, wherein the module comprises a door that opens in response to deployment of the airbag, the door being configured to serve as a reaction surface for the airbag.

5. The apparatus recited in claim 4, wherein the module further comprises a tether for limiting movement of the door so that the door can serve as a reaction surface for the airbag.

6. The apparatus recited in claim 2, wherein the deployable restraint comprises a restraining panel configured to move to a deployed position extending above the vehicle floor adjacent the occupant's lower legs and feet, the restraining panel, when deployed, engaging the occupant's feet to prevent the feet and lower legs of the occupant from swinging upward and forward in response to a vehicle collision.

7. The apparatus recited in claim 6, wherein the module comprises an actuator for actuating the restraining panel to pivot or otherwise move to the deployed position.

8. The apparatus recited in claim 7, wherein the actuator comprises a pyrotechnic actuator.

9. The apparatus recited in claim 8, wherein the pyrotechnic actuator is configured to limit movement of the restraint panel after deployment so that the restraint panel can act as a reaction surface for receiving the occupant's feet and legs.

10. The apparatus recited in claim 1, wherein the vehicle is an autonomous vehicle.

11. A safety module comprising the apparatus of claim 1 and further comprising a housing configured to be mounted in the vehicle floor.

12. A vehicle safety system comprising the safety module of claim 11, wherein the deployable restraint is configured to be actuated in response to the occurrence of the event for which deployment is desired.

13. A method for helping to protect occupants of a vehicle in the event of a collision, comprising providing a deployable restraint having a stored, pre-deployment condition in a vehicle floor, and deploying from the vehicle floor the deployable restraint, the deployable restraint being configured to restrain the feet and/or lower legs of an occupant from swinging forward and upward in response to a vehicle collision.

14. The method recited in claim 13, wherein the restraint comprises an airbag module including an airbag and an inflator for inflating and deploying the airbag.

15. The method recited in claim 14, wherein the module comprises a door that opens in response to deployment of the airbag, the door being configured to serve as a reaction surface for the airbag.

16. The method recited in claim 15, wherein the module further comprises a tether for limiting movement of the door so that the door can serve as a reaction surface for the airbag.

17. The method recited in claim 13, wherein the deployable restraint comprises a module comprising restraining panel configured to move to a deployed position extending above the vehicle floor adjacent the occupant's lower legs and feet, the restraining panel, when deployed, engaging the occupant's feet to prevent the feet and lower legs of the occupant from swinging upward and forward in response to a vehicle collision.

18. The method recited in claim 17, wherein the module comprises an actuator for actuating the restraining panel to pivot or otherwise move to the deployed position.

19. The method recited in claim 18, wherein the actuator comprises a pyrotechnic actuator.

20. The method recited in claim 19, wherein the pyrotechnic actuator is configured to limit movement of the restraint panel after deployment so that the restraint panel can act as a reaction surface for receiving the occupant's feet and legs.

* * * * *